May 1, 1951      L. M. ALLISON      2,551,309
FISHING REEL
Filed March 18, 1946      2 Sheets-Sheet 1
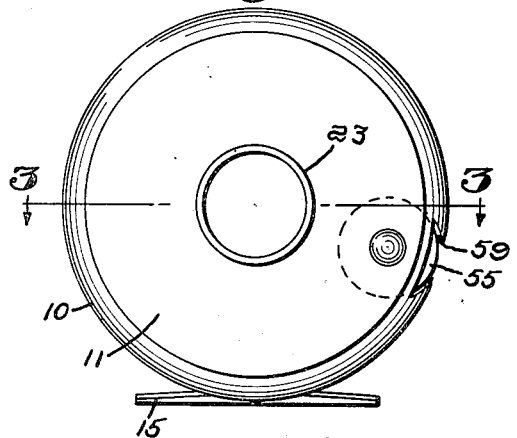
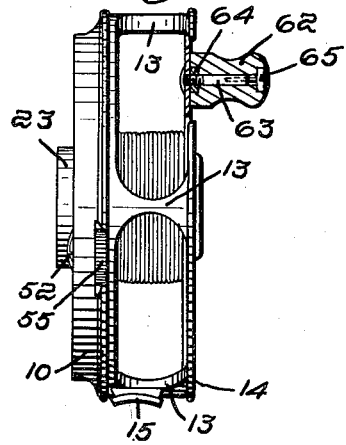
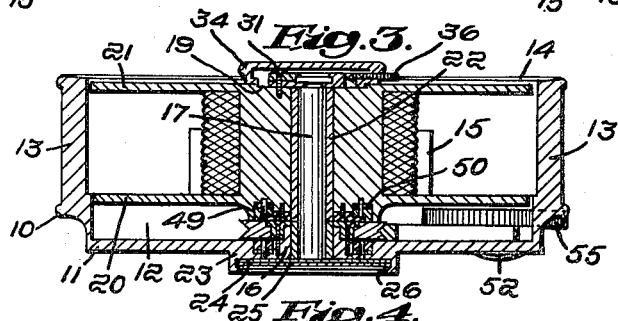
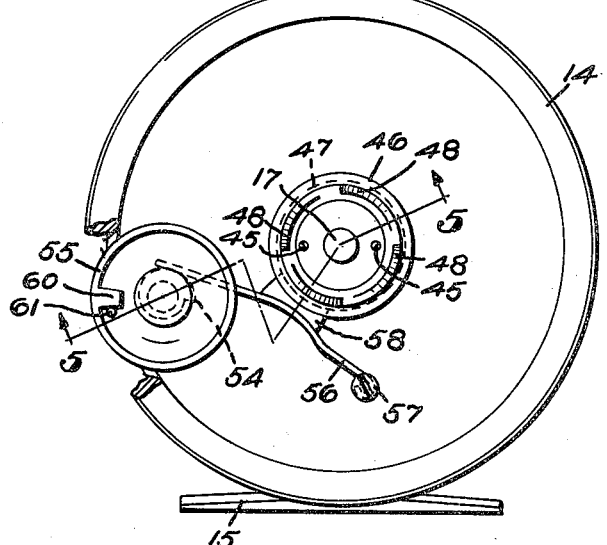
Inventor:
L. Mont Allison,
by Geo. B. Rawlings.
Attorney May 1, 1951     L. M. ALLISON     2,551,309
FISHING REEL
Filed March 18, 1946     2 Sheets-Sheet 2
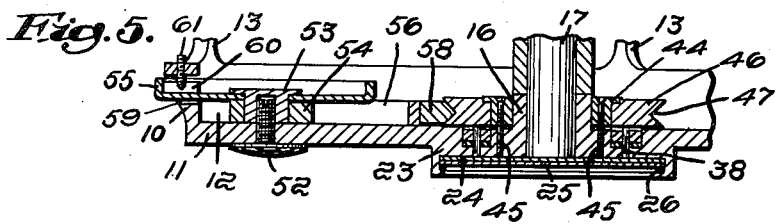
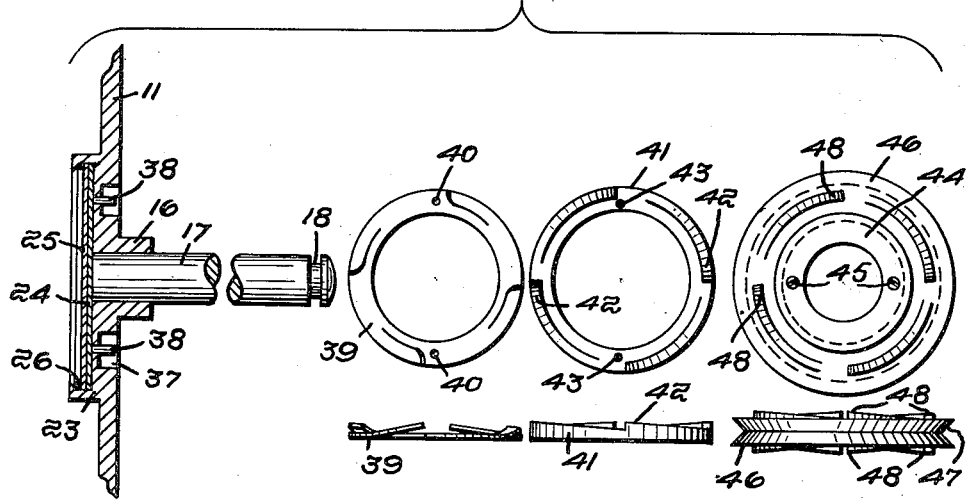
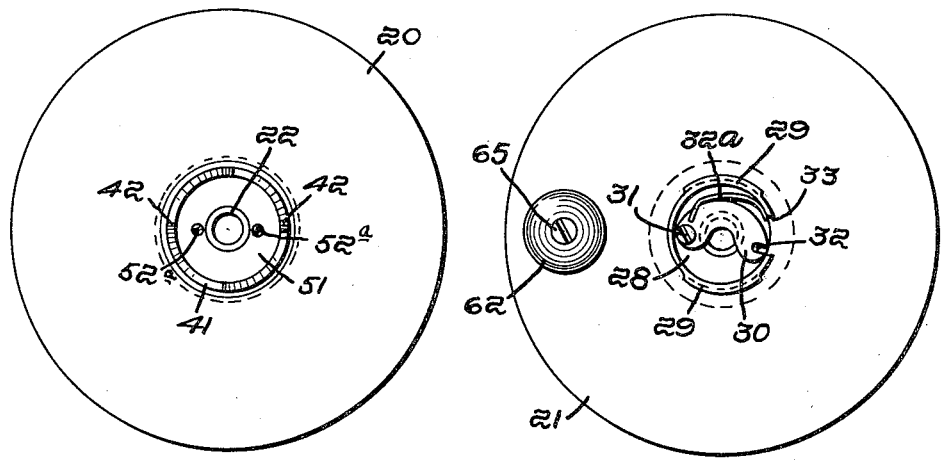
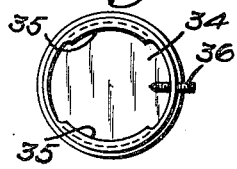
Inventor:
L. Mont Allison,
by Geo B Rawlings
Attorney Patented May 1, 1951

2,551,309

UNITED STATES PATENT OFFICE 2,551,309

FISHING REEL

Lowell Mont Allison, Belmont, Mass.

Application March 18, 1946, Serial No. 655,170

2 Claims. (Cl. 242—84.6)

My present invention relates to reels, and more particularly to improvements in fishing reels.

An object of my invention is an improved readily dismountable fishing reel.

One object of my invention is to provide an improved fishing reel brake mechanism which permits effective control of braking pressure when line is unreeled from the reel and which is free from the drag of the brake when the line is being retrieved.

In accordance with the above and other objects, the invention comprises a fishing reel having a frame in which a spool is rotatably mounted. Interposed between the spool and one end of the frame is a brake drum having ratchet teeth on its inner face arranged to engage a spring pressed ratchet mounted on the inner face of the spool and having ratchet teeth on its outer face arranged to engage a ratchet mounted in the frame whereby the spool may be rotated in either direction.

As illustrated, the present reel is provided with simple and effective means for varying the drag of the brake which includes a cam rotatable in the reel frame and engaging the free end of a pivoted spring bearing on a brake shoe having a spring seat which engages said spring substantially midway between its pivot point and free end and means associated with the cam which extend outwardly through the frame and permit the tension of the spring to be controlled by rotation of the cam.

Other objects and novel features of the construction and arrangement of parts comprising my invention will appear as the description thereof progresses.

In the accompanying drawings:

Fig. 1 is a side elevation of a fishing reel embodying my invention.

Fig. 2 is an end elevation.

Fig. 3 is a sectional view, taken on the line 3—3 of Fig. 1.

Fig. 4 is a side elevation of the frame, the spool or reel having been removed.

Fig. 5 is a sectional view, taken on the line 5—5 of Fig. 4.

Fig. 6 is an exploded view of a portion of the frame, and the parts of the brake mechanism associated therewith.

Fig. 7 is an elevation of the inner end or face of the spool or reel.

Fig. 8 is an elevation of the outer end or face of the spool or reel, and

Fig. 9 is a view of the locking cap for the spool or reel.

The illustrated embodiment of the present invention includes a cylindrical frame 10 having a generally cup-shaped end portion or backplate 11 forming a cylindrical chamber 12 for housing the brake mechanism. The frame 10 is further provided with radially spaced members 13 which connect the end portion 11 with a ring-shaped end member 14. As illustrated, the above mentioned elements of the frame 10 are formed in one piece but it is evident that frame 11 could be formed of a plurality of pieces if so desired.

The end portion 11 is provided with a centrally located and outwardly extending boss 16 which is bored to receive and hold the end of a shaft 17. The outer end portion of the shaft 17 is provided with an annular groove 18 which is arranged, as will later be described to provide a convenient means for locking a spool or reel in position on the shaft 17.

The spool, which comprises generally a hub 19 and inner and outer end walls 20 and 21, respectively, is rotatably mounted on the shaft 17 and is provided with an axially extending hole receiving a bearing 22. The bearing 22 may be formed of any suitable bearing material but in order to avoid necessity of oiling the reel, it is preferred to use a bearing material such as "Oilite" which consists of powdered bronze which has been pressed, heat-treated by sintering, and impregnated with a high grade non-gumming oil.

The outer face of the frame end portion 11 is provided with an integrally formed boss 23 which is recessed and houses a suitable identification plate 24 and which is covered by a disk 25 of transparent material. The plate 24 and the disk 25 are maintained in position in the recess by a suitable retaining ring 26.

The outer side of the spool face 21 is formed with a centrally located circular depression in which is seated a cup-shaped member 28 having integrally formed outstanding arcuate lugs 29. As shown best in Fig. 8, a locking pawl 30, which is pivotally mounted on a screw 31 threaded into the bottom of the cup-shaped member 28, is arranged to enter the slot 18 in the shaft 17 to lock the spool against undesired axial displacement. The locking pawl 30 is normally urged in a clock-wise direction, as viewed in Fig. 8, by a leaf spring 32a and which is secured at one end to the pawl 30 and at its other end bears against the inner wall of the cup-shaped member 28.

In order to facilitate removal and replacement of the spool in the frame 10, the free end of the pawl 30 is provided with a substantially radially extending slot or notch 32 which is in alignment with notch 33 formed in the wall of the cup-shaped member 28. The notch 32 is arranged to receive the end of a pin 36 which is threaded into the side wall of a cover member 34 which in turn is provided with inwardly extending lugs 35. As is shown in Fig. 9, the lugs 35 are spaced radially from each other a distance sufficient to receive therebetween the lugs 29 on the cup-shaped member 28. Thus when the cover 34 is rotated relatively to the cup-shaped member 28, the lugs 29 and 35 will become engaged and prevent relative axial movement thereof. After the parts are assembled as described above, the pin 36 is threaded into a hole in the cover 34 and enters the slot or notch 32 of the locking pawl 30. Thus, rotation of the cover 34 is effective to remove the pawl 30 from the groove 18 and thus permit release of the spool from the shaft 17.

The brake mechanism of the present invention is so located in the frame 10 that it is substantially entirely enclosed when the spool or reel is locked in place on the shaft 17. The present brake mechanism comprises a novel combination of elements which are economical to manufacture and which may quickly and easily be assembled to form an effective brake. An annular groove 37 concentric with the boss 16 is formed in the body 11 of the frame 12, and is provided with a pair of substantially diametrically opposed pins 38. A spring washer 39 is housed in the groove 37 and is provided with suitable openings 40 through which the pins 38 are free to pass. The spring washer 39 is preferably formed of a suitable material, such as beryllium-copper, which is substantially free from fatigue and hence retains its resiliency over a long period of time. Mounted in the groove 37 and supported by the spring washer 39, is a ratchet washer 41. This washer 41 is preferably formed of stainless steel thus minimizing to a great extent any tendency toward sticking or binding of the parts. The surface of the washer 41 in engagement with the spring washer 39 is substantially flat while the other surface thereof is provided with a plurality of ratchet teeth 42. The washer 42 is provided with perforations 43 through which the pins 38 pass. The spring washer 38 and the ratchet washer 41 are thus held against rotation but are free to move axially thus permitting the ratchets to engage as will later be described. In order to reduce drag on the spool when rewinding the line, a bushing 44 is mounted on the boss 16 and is secured to the body 11 by screws 45, as is most clearly shown in Fig. 6. The bushing 44 is preferably formed of an oil bearing material, such as "Oilite" mentioned above. A brake drum or disk 46 is rotatably mounted on the bushing 44. The drum 46 is preferably formed of stainless steel and is provided on each face with upstanding ratchet teeth 48 which are of the same pitch as the ratchet teeth 42 on the washer 41. The drum 46 is preferably provided with a peripheral groove 47 into which fits a suitably shaped surface of a brake shoe 58.

The inner wall 20 of the spool or reel is provided with a boss 49 (Fig. 3) in which is formed an annular groove 50 similar to the groove 37 in the frame body 11. The groove 50 is provided with substantially diametrically disposed axially extending pins, similar to pins 38, which are secured in holes in a spring washer and a ratchet washer which are substantially identical with the spring washer and ratchet washer 39 and 41. The pins act to hold the washers against rotation but permit vertical or axial movement to cause engagement of the various ratchets. In order to prevent separation of the washers from the spool or reel, a retaining plate 51 (Fig. 7) is provided and which is secured to the wall wall 20 by screws 52a. Thus, sufficient axial movement of the ratchet washer is permitted while at the same time permitting removal of the spool or reel from the frame without loss or undesired displacement of the ratchet members.

Convenient and positive control of the brake shoe 58 is provided through a wheel or disk 55 which is mounted adjacent to the periphery of the body 11 in a position where it may readily be rotated by the thumb of the fisherman. The disk 55 is mounted on a bearing screw 52 which is threaded through the body 11 and into a bearing member 53, and located between the body 11 and the inner wall 20 of the spool 21. As shown more clearly in Fig. 1, the control disk 55 extends through a slot formed in the peripheral portion of the body 11. The disk 55 is provided with a cam 54 which is suitably secured thereto and rotates therewith. The cam 54 engages the free end of a leaf spring 56 which is pivotally secured to the body 11 by a screw 57. The spring 56 intermediate its ends engages the brake shoe 58 (above referred to) which is preferably formed of material such as "Oilite." The cam disk 55 is preferably knurled for convenient thumb or finger operation. Rotation of the disk 55 is limited by a stop screw 61 which is threaded through a portion of the body 11 and is adapted to be engaged by a projection or stop on the disk 55.

By rotating the disk 55, and thus the cam 54, the spring 56 is flexed to increase or decrease the pressure exerted by the brake shoe 58 on the brake drum 46. The ratchet teeth on the ratchet washer mounted in the spool and the cooperating ratchet teeth on the brake drum are so arranged that the teeth are in driving engagement only when the line is withdrawn from the spool. When the spool is rotated in the opposite direction, the ratchet teeth slide over each other in clicking relation and the spool is thus free from the drag of the brake.

The brake shoe 58 is provided with an arcuate seat for the spring 56. Thus, pressure of the brake shoe 58 is distributed over a greater area of the spring 56 and as a result localized pressure on the spring is minimized and the danger of breakage thereof is accordingly reduced. Since the brake shoe 58 is formed of an oil filled material, the brake drum 46 is sufficiently lubricated to reduce friction between the drum and the shoe and also prevents "freezing" or binding when the parts are subjected to a relatively long-continued heavy strain. The angle which the sides of the V-groove form with the sides of the brake drum 46 is substantially 45°. The illustrated V-groove in the peripheral portion of the brake drum 46 is particularly advantageous since it increases substantially the breaking surface as compared with a flat surface on the same width of material. The use of brake elements constructed as described above provides a simple, long wearing brake wherein the braking surfaces are maintained in effective braking condition without objectionable glazing or grabbing.

The spool or reel is rotated to rewind the line by means of a handle 62 of usual construction which is rotatably mounted on a shaft 63 screwed into the outer wall 21 of the spool and held rigidly in place by a nut 64 which is screwed onto the shaft 63 and is seated firmly against the outer face of the wall 21. The handle 62 is held on the shaft 63 by a screw 65 which permits the handle to revolve freely on the shaft 63.

When the spool or reel is turned by the handle 62 in winding the line onto the spool or reel, the ratchet washer 41 in the annular groove 37 in the body or frame acts with the teeth 48 on the lower face of the brake drum 46 (see Fig. 6) as a lock for the brake, while the ratchet washer 41 in the annular groove 50 in the spool or reel 20 acts with the teeth 48 on the upper face of the brake drum 46 as an overrunning clutch causing the click to operate. The reverse is true when the line is being payed out, as when a fish takes the bait, in which case the user manipulates the disc 55 with his thumb to apply the desired degree of tension to the line through spring 56 acting upon brake shoe 58.

From the foregoing description, taken in connection with the drawings, it will be evident that I have provided a compact and reliable reel which is characterized by the mechanical simplicity of its design. The thumb or finger wheel 55 is conveniently located at the periphery of the case for handy operation to apply tension to the brake at the will of the operator and the construction and operation of the brake is such as to insure positive control of the line at all times, allowing the brake to retard the action of the fish but exerting no braking effect on the rewinding of the line. Moreover, the locking device 30 is not only easy to manipulate but being built into the case will not become lost.

While I have described and illustrated a preferred embodiment of my invention, I recognize that the construction shown may be modified somewhat without departing from the spirit and scope of my invention, and accordingly assert as within the purview of my invention all modifications in design which come within the limits of the appended claims.

Having thus described my invention, what I claim as new and desire to secure by Letters Patent is:

1. A fishing reel comprising, in combination, a frame including a substantially circular backplate and an axially spaced ring member and connecting elements, a post carried by said backplate and extending axially thereof toward said ring member, a spool journaled on said post for rotation thereon, means for securing said spool on said post in predetermined fixed axial relation to said backplate, a brake drum rotatably mounted on said post adjacent to said backplate and between the backplate and the spool, said brake drum having a plurality of circularly arranged ratchet teeth on each of its radial surfaces and said teeth extending axially outwardly of the respective radial surfaces, a ratchet washer disposed axially of said post and secured against rotation to said backplate and spring-pressed axially toward said brake drum, said ratchet washer having a plurality of circularly arranged ratchet teeth extending axially toward and cooperative with the adjacent ratchet teeth of said brake drum so as to permit clicking rotation of the brake drum against said ratchet washer when line is being withdrawn from the spool, a second ratchet washer secured against rotation to the rearwardly facing wall of said spool and spring-pressed axially toward said brake drum, said second ratchet washer having a plurality of circularly arranged ratchet teeth, said ratchet teeth extending axially toward and cooperating with the adjacent ratchet teeth of said brake drum so as to permit clicking rotation of the spool against the brake drum when line is being wound upon said spool and to cause rotation of the brake drum with the spool when line is being withdrawn from the spool, and a brake shoe cooperative with the peripheral surface of said brake drum.

2. A fishing reel comprising, in combination, a frame including a substantially circular backplate and an axially spaced ring member and connecting elements, a post carried by said backplate and extending axially thereof toward said ring member, a spool journaled on said post for rotation thereon, means for securing said spool on said post in predetermined fixed axial relation to said backplate, a brake drum rotatably mounted on said post adjacent to said backplate and between the backplate and the spool, said brake drum having a plurality of circularly arranged ratchet teeth on each of its radial surfaces, a ratchet washer disposed axially of said post and secured against rotation to said backplate and having a plurality of circularly arranged ratchet teeth cooperative with the adjacent ratchet teeth of said brake drum so as to permit clicking rotation of the brake drum against said ratchet washer when line is being withdrawn from the spool, a second ratchet washer secured against rotation to the rearwardly facing wall of said spool and having a plurality of circularly arranged ratchet teeth, said ratchet teeth being cooperative with the adjacent ratchet teeth of said brake drum so as to permit clicking rotation of the spool against the brake drum when line is being wound upon said spool and to cause rotation of the brake drum with the spool when line is being withdrawn from the spool, a cam disk secured to the inner surface of said backplate and rotatable about an axis parallel to said post and extending radially beyond the periphery of said backplate, a cam rotatable with and carried by said cam disk directly adjacent to said backplate, a leaf spring directly adjacent to said backplate and having its free end riding on said cam and its fixed end secured to said backplate, and a free floating brake shoe directly adjacent to said backplate and disposed between said spring and the peripheral surface of said brake drum and urged toward said brake drum by said spring.

LOWELL MONT ALLISON.

REFERENCES CITED

The following references are of record in the file of this patent:

UNITED STATES PATENTS

| Number | Name | Date |
|---|---|---|
| 853,311 | Marhoff | May 14, 1907 |
| 1,690,401 | Case | Nov. 6, 1928 |
| 1,813,275 | Burdick | July 7, 1931 |
| 2,059,765 | Adams | Nov. 3, 1936 |
| 2,083,927 | Sinex | June 15, 1937 |
| 2,231,340 | Lee | Feb. 11, 1941 |
| 2,295,503 | Miller | Sept. 8, 1942 |
| 2,331,249 | Treadway | Oct. 5, 1943 |
| 2,408,430 | Lowey et al. | Oct. 1, 1946 |
| 2,421,925 | Cooley | June 10, 1947 |

FOREIGN PATENTS

| Number | Country | Date |
|---|---|---|
| 13,156 of 1906 | Great Britain | June 7, 1907 |
| 60,708 | Norway | Apr. 11, 1939 |
| 69,100 | Sweden | Jan. 19, 1929 |
| 155,380 | Great Britain | Dec. 20, 1920 |